(12) United States Patent  (10) Patent No.: US 9,599,852 B1
Galstian  (45) Date of Patent: Mar. 21, 2017

(54) MANUFACTURING OF LIQUID CRYSTAL LENSES USING CARRIER SUBSTRATE

(71) Applicant: LensVector Inc., Sunnyvale, CA (US)

(72) Inventor: Tigran Galstian, Quebec (CA)

(73) Assignee: Lensvector, Inc., Sunnyvale, CA (US)

( * ) Notice: Subject to any disclaimer, the term of this patent is extended or adjusted under 35 U.S.C. 154(b) by 0 days.

(21) Appl. No.: 14/451,732

(22) Filed: Aug. 5, 2014

Related U.S. Application Data

(60) Provisional application No. 61/862,465, filed on Aug. 5, 2013.

(51) Int. Cl.
*H01L 33/52* (2010.01)
*G02F 1/1333* (2006.01)
*G02F 1/1337* (2006.01)
*G02F 1/1335* (2006.01)
*G02F 1/1339* (2006.01)

(52) U.S. Cl.
CPC ...... *G02F 1/133526* (2013.01); *G02F 1/1339* (2013.01); *G02F 1/13394* (2013.01)

(58) Field of Classification Search
CPC ............... H01L 21/6835; H01L 21/78; H01L 2221/68359; H01L 2224/13078; H01L 2224/32057; H01L 2224/48137; H01L 2224/83191; H01L 2224/97; H01L 24/29; H01L 24/32; H01L 24/50; H01L 24/83; H01L 24/97; H01L 25/0655
See application file for complete search history.

(56) References Cited

U.S. PATENT DOCUMENTS 5,667,884 A * 9/1997 Bolger .................. 428/323
6,355,125 B1 * 3/2002 Tahon ............... B32B 17/10036
156/265

(Continued)

FOREIGN PATENT DOCUMENTS

JP 2005/222789 8/2005
JP 2005-222789 8/2005

(Continued)

OTHER PUBLICATIONS

Toshihiko Higuchi et al., P-150L: Late-News Poster: A Novel Handling Method of Ultra-Thin Glass for Thin and Flexible Displays, SID Symposium Digest of Technical Papers, vol. 43, Issue 1, pp. 1372-1374, Jun. 2012.

*Primary Examiner* — Pamela E Perkins
(74) *Attorney, Agent, or Firm* — J-TEK Law PLLC; Jeffrey D. Tekanic; Scott T. Wakeman (57) ABSTRACT

A method of manufacturing a liquid crystal optical device such as a lens, a beam steering device or an optical image stabilization device is described. The method includes edge bonding a thin substrate onto a carrier substrate to obtain a combined substrate; manipulating the combined substrate by the carrier substrate for wafer level fabricating at least one liquid crystal optical device on the central portion of the first thin substrate. Each liquid crystal optical device includes liquid crystal cell walls. To form the at least one liquid crystal optical device a second thin substrate is provided and bonded to the combined substrate. The cell walls support and interconnect the thin first substrate to the second thin substrate. The at least one liquid crystal optical device is singulated by dicing the combined substrate within the peripheral bonding zone.

15 Claims, 10 Drawing Sheets

(56) References Cited

U.S. PATENT DOCUMENTS

| | | | |
|---|---|---|---|
| 6,831,727 B2 | 12/2004 | Akiyama et al. | |
| 6,864,944 B1 * | 3/2005 | Scattergood et al. | 349/156 |
| 8,344,261 B2 | 1/2013 | Lee et al. | |
| 2003/0071954 A1 * | 4/2003 | Krum et al. | 349/153 |
| 2004/0131957 A1 * | 7/2004 | Kubota et al. | 430/15 |
| 2005/0151902 A1 * | 7/2005 | Wang | G02F 1/133377 |
| | | | 349/114 |
| 2006/0001761 A1 * | 1/2006 | Haba et al. | 348/340 |
| 2010/0267203 A1 | 10/2010 | Chen et al. | |
| 2011/0026236 A1 | 2/2011 | Kondo et al. | |
| 2011/0192525 A1 | 8/2011 | Kondo et al. | |
| 2012/0009703 A1 * | 1/2012 | Feinstein | G02F 1/1333 |
| | | | 438/28 |
| 2012/0202030 A1 | 8/2012 | Kondo et al. | |
| 2012/0235315 A1 | 9/2012 | Wu et al. | |
| 2012/0268708 A1 | 10/2012 | Chida | |
| 2012/0313137 A1 * | 12/2012 | Shin et al. | 257/100 |
| 2013/0023075 A1 | 1/2013 | Lee et al. | |
| 2013/0088637 A1 | 4/2013 | Duparre | |
| 2013/0143464 A1 | 6/2013 | Kim et al. | |
| 2013/0169920 A1 | 7/2013 | Wada | |
| 2013/0188103 A1 | 7/2013 | Jeng | |
| 2015/0187637 A1 * | 7/2015 | Khachatryan | H01L 21/76254 |
| | | | 438/458 |

FOREIGN PATENT DOCUMENTS

| | | |
|---|---|---|
| WO | 2013/040051 | 3/2013 |
| WO | 2013/082076 | 6/2013 |

* cited by examiner

MANUFACTURING OF LIQUID CRYSTAL LENSES USING CARRIER SUBSTRATE

RELATED APPLICATIONS

This application is a non-provisional of, and claims priority from, U.S. 61/862,465, entitled "Manufacturing of Liquid Crystal Lenses Using Carrier Substrate", filed Aug. 5, 2013, the entirety of which is incorporated herein by reference.

TECHNICAL FIELD

This application relates to wafer or panel manufacturing techniques where a number of devices are wafer level fabricated together on a common substrate, and then singulated into individual devices. More specifically, this application relates to wafer-level fabrication of liquid crystal optical devices wherein substrates of the liquid crystal devices are very thin having insufficient strength for self support during fabrication.

BACKGROUND

Significant investment has been made in building manufacturing infrastructure for handling glass panel substrates for wafer level fabrication. Such typical manufacturing lines include dedicated machines for glass panel manipulation, glass panel washing, glass panel coating, assembling, etc.

Liquid Crystal Display (LCD) manufacturing is of special interest, where the glass substrates traditionally employed had thicknesses in the order of one millimeter for manufacturing displays intended for home or office use (etc.). The development of mobile devices has created the necessity of using much thinner substrates for mobile displays with thicknesses in the order of a hundred micrometers. Separation gaps between substrates for implementing liquid crystal layers in such mobile displays often are in the order of few micrometers only. In addition, typical feature sizes of such mobile displays are becoming smaller and smaller, e.g., in the order of about 10 micrometers. Many manufacturing processes employed during wafer level display fabrication do not tolerate substrate bend, bubbles and/or other defects. It is often impossible to use currently available equipment in existing manufacturing lines to directly manufacture mobile displays.

Prior attempts to address this miniaturization problem use a carrier substrate to manipulate the required thin substrate during manufacturing.

Figure 1A:
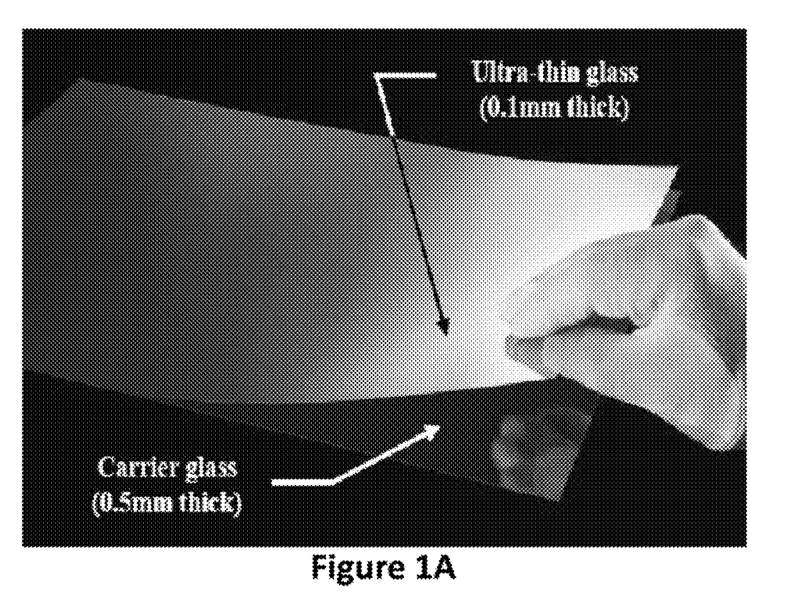
FIG. 1A shows a prior art thin glass substrate electrostatically laminated to a thick carrier glass substrate provided by Asahi Glass Corporation.
Figure 1B:
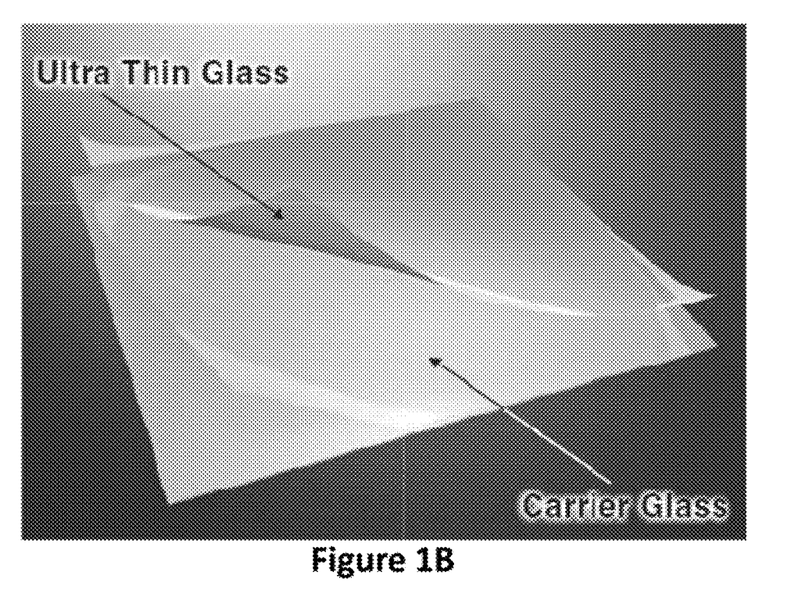
FIG. 1B shows another prior art thin glass substrate adhesively laminated to a thick carrier glass substrate provided by Nippon Electric Glass.

For example, Asahi Glass Corporation has tried to develop a "carrier glass" technique as shown in FIG. 1A, while Nippon Electric Glass has tried a "glass-on-glass" approach as shown in FIG. 1B. A thin glass substrate, for example 100 micrometer thick, is temporarily attached to a thick carrier glass substrate for providing a combined thick and robust panel. The combined panel can be used in the fabrication of mobile displays using traditional manufacturing lines.

In order to provide the high precision required for mobile displays, the combined carrier (thick) and thin substrates must be laminated (attached) over their entire respective surfaces very uniformly, without bubbles, defects and deformations. In accordance with one prior art proposal, the thin and thick glass substrates are attached together by specific electro static forces over the entire area of the combined panel. In accordance with another prior art proposal, the creation of the combined panel employs a thin adhesive layer, again, dispersed over the entire surface of the combined panel. Because of the very high quality and precision requirements for mobile display applications, the above mentioned approaches are costly.

After the wafer level fabrication is complete, the thick carrier glass substrate is delaminated (detached) and the remaining display is thin and of reduced weight (light). However, specialized equipment must be used for the delamination (detachment) of the carrier glass substrate depending on the technology used to attach the thin glass substrate and the thick carrier glass substrate together.

SUMMARY

However, other than manufacturing of high quality mobile displays, there are other devices where thin substrates (glass, ceramic, polymer or composite) are also required without requiring a high quality combined panel. In such applications, there is no necessity of having the two substrates (thin and thick) laminated together over the entire surface of the combined panel. An example of such other devices is an electrically variable (tunable) liquid crystal lens devices which are wafer level fabricated in arrays.

For electrically variable liquid crystal lens devices, the gap between substrates sandwiching the liquid crystal layer is much larger, in the order of tens of micrometers instead of the few micrometers required for mobile displays. As well, the device features are relatively larger. The combined panel can be of lower quality relative to quality demanded by mobile displays, and correspondingly significantly less expansive.

In accordance with an aspect of the proposed solution, in manufacturing arrays of electrically variable liquid crystal lenses, the method of attaching the thin substrate to the thick carrier substrate can be simplified and only the periphery of the thin substrate is attached to a thick glass substrate at least of the same or preferably larger size than the thin substrate. In some implementations of the proposed solution, at least some, preferably all, edges of the thin substrate are sealed to the thick carrier substrate. Additional seal lines or attachment points can also be employed without increasing significantly the cost of manufacture.

In some implementations, when the manufacturing processes used in wafer level fabrication of devices are not very challenging (low temperature, dry processing, etc.), the peripheral thin substrate attachment to the carrier substrate can be performed by using thin adhesive bands.

When manufacturing processes are more challenging, laser sealing of the periphery can used, which is preferred also for quasi hermeticity. Cleaning the peripheral area (the area to be laser sealed) of both substrates and removing dust can allow the laser sealing to be performed between two the substrates without additional coatings.

When high temperature manufacturing processes are employed during wafer level fabrication, using thin and thick substrates of similar, preferably the same, material composition would be indicated in order to provide similar thermal expansion coefficients, etc.

Wafer level fabrication of devices employing such a combined substrate can use traditional manufacturing equipment. The thin and thick substrates can simply be detached by mechanical or laser dicing around attachment areas, typically within the peripheral attachment zone.

In accordance with an aspect of the proposed solution, there is provided a method of manufacturing a liquid crystal optical device, such as a lens, comprising: edge bonding a thin substrate onto a carrier substrate wherein the thin substrate is not bonded to the carrier substrate in a central portion; using the carrier substrate to manipulate the combined thin substrate and carrier substrate while preparing the thin substrate to contain an array of liquid crystal optical devices in the central portion, the liquid crystal optical devices including cell walls for connecting between substrates; providing a second substrate and bonding the second substrate to the combined thin substrate and carrier substrate to form the array of liquid crystal optical devices including the cell walls for each liquid crystal optical device; and singulating the liquid crystal optical devices, wherein the cell walls support and interconnect the thin substrate to the second substrate.

In accordance with another aspect of the proposed solution, there is provided a method of manufacturing a liquid crystal optical device such as a lens, a beam steering device or an optical image stabilization device, the method comprising: edge bonding a first thin substrate onto a carrier substrate to obtain a combined substrate; manipulating the combined substrate by the carrier substrate for wafer level fabricating at least one liquid crystal optical device on the central portion of the first thin substrate; providing a second thin substrate and bonding the second thin substrate to the combined substrate to form the at least one liquid crystal optical device, each liquid crystal optical device including the liquid crystal cell walls, wherein the cell walls support and interconnect the thin first substrate to the second substrate; and singulating the at least one liquid crystal optical device by dicing the combined substrate within the peripheral bonding zone.

The substrate material can be glass or a suitable plastic material depending on application and optical device properties.

In some implementations, temperature resistant edge bonding can be provided by laser bonding of the thin substrate to the carrier substrate.

The thin substrate can be released from the carrier substrate prior to singulation, or the combined thin and carrier substrates can be singulated together.

The liquid crystal optical devices can be liquid crystal lenses, preferably electrically controlled tunable liquid crystal lenses. Liquid crystal beam steering devices and optical image stabilization devices can also be made in a similar manner. The edge bonding can be temperature resistant at temperatures at which polyimide alignment layers can be baked during the manufacture of liquid crystal optical devices.

Some liquid crystal optical devices employ a pair of liquid crystal layers, and a top thin substrate sandwiching a bottom liquid crystal layer will have its carrier removed prior to adding it on top of the layered structure of the bottom liquid crystal cell. Additional manufacturing steps include depositing at least one further substrate on top of the top thin substrate of the bottom liquid crystal cell. In the fabrication of such liquid crystal optical devices, a bottom carrier substrate can be retained until the additional manufacturing steps are completed.

The additional thin substrate can comprise a second thin substrate edge bonded to a second carrier substrate, wherein the second thin substrate is not bonded to the second carrier substrate in a central portion thereof.

BRIEF DESCRIPTION OF THE DRAWINGS

The proposed solution will be better understood by way of the following detailed description of embodiments of the invention with reference to the appended drawings, in which.

wherein similar features bear similar labels throughout the drawings. While the layer sequence described is of significance, reference to "top" and "bottom" qualifiers in the present specification is made solely with reference to the orientation of the drawings as presented in the application and do not imply any absolute spatial orientation.

DETAILED DESCRIPTION

Figure 2:
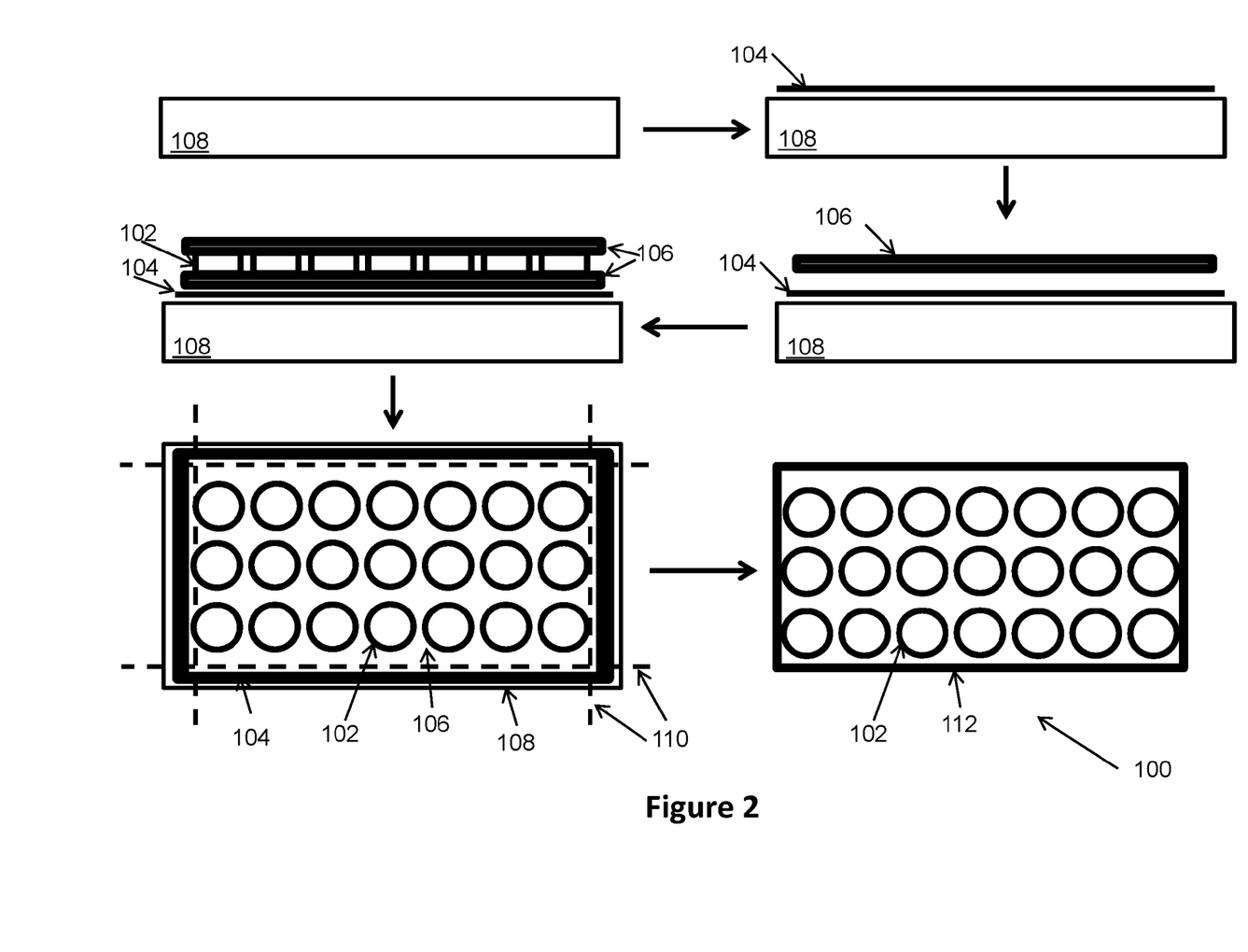
FIG. 2 illustrates a sequence of manufacturing steps employing a peripheral adhesive band for securing a thin substrate to a carrier substrate, the use of the combined substrates for wafer level fabrication of at least one liquid crystal optical device, and illustrates final removal of the carrier substrate, in accordance with an embodiment of the proposed solution.

FIG. 2 schematically illustrates a sequence of manufacturing steps 100 for wafer level fabrication of at least one liquid crystal optical device 102. In accordance with an embodiment of the proposed solution, a peripheral adhesive band 104 is employed for securing a thin substrate 106 to a carrier substrate 108. For example the thin substrate 106 is sealed to the carrier substrate 108 by employing a thin peripheral coating band 104 of adhesive. The combined substrate is manipulated by the carrier substrate 108 during multiple wafer level fabrication steps.

The carrier substrate 108 and the thin substrate 106 are preferably made of the same material to prevent thermal stresses during processing at elevated temperatures.

Figure 7:
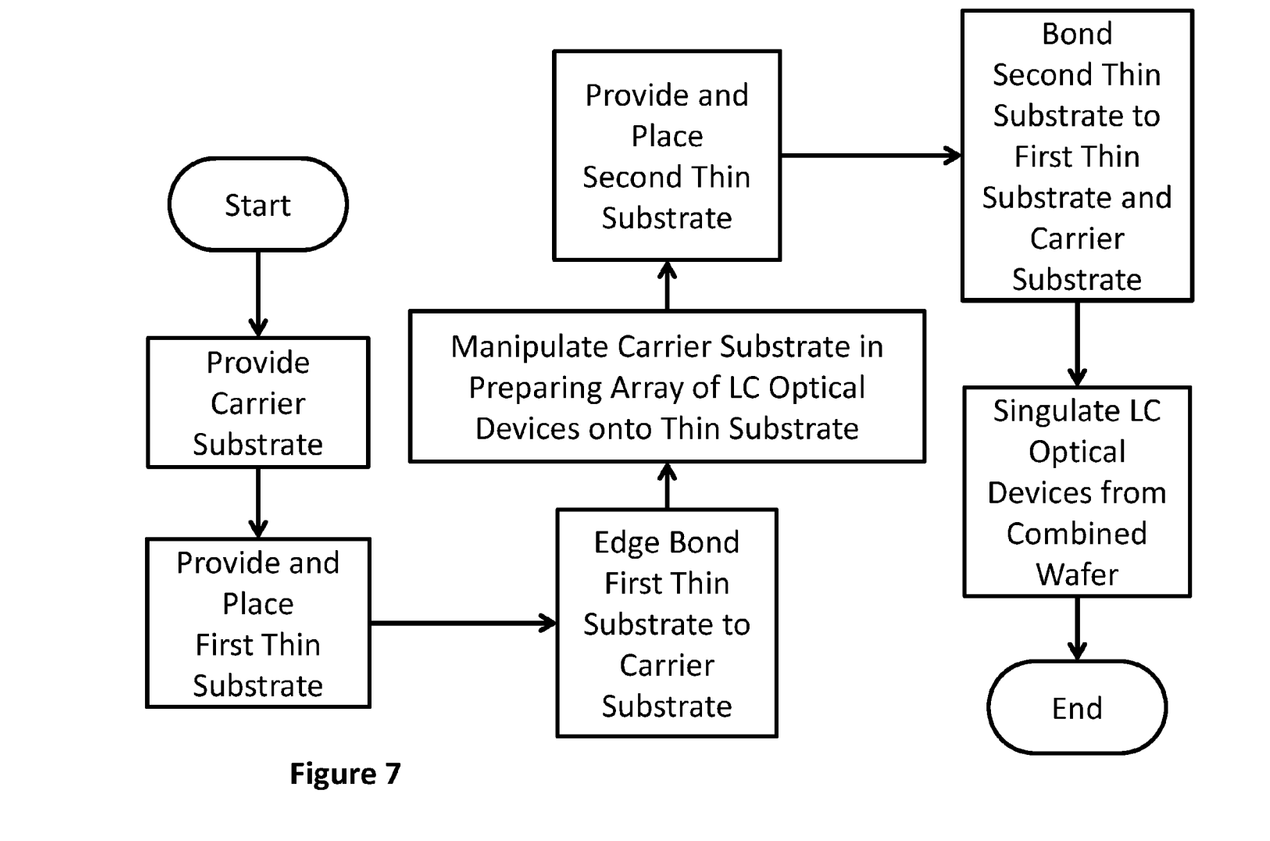

For example manufacturing of liquid crystal devices 102 includes enclosing (sandwiching) liquid crystal material between substrates, preferably between thin substrates 106. A bottom thin substrate 106 is secured to a bottom carrier substrate 108 using a peripheral adhesive band 104. A liquid crystal optical device top substrate covering the bottom thin substrate 106 can preferably be another thin substrate 106 secured to a corresponding top carrier substrate 108 by also employing a peripheral adhesive band 104. General process steps in such manufacturing are illustrated in FIG. 7.

Some liquid crystal optical devices (not shown) employ two layers of liquid crystal of similar layer geometry. The top combined substrate associated with the bottom liquid crystal cell will have its carrier substrate 108 removed prior to performing wafer level fabrication steps including providing at least one further substrate, for example adding another thin substrate 106 on top of the top thin substrate 106. The bottom carrier substrate 108 can be retained until the additional wafer level fabrication steps are completed.

Figure 8:
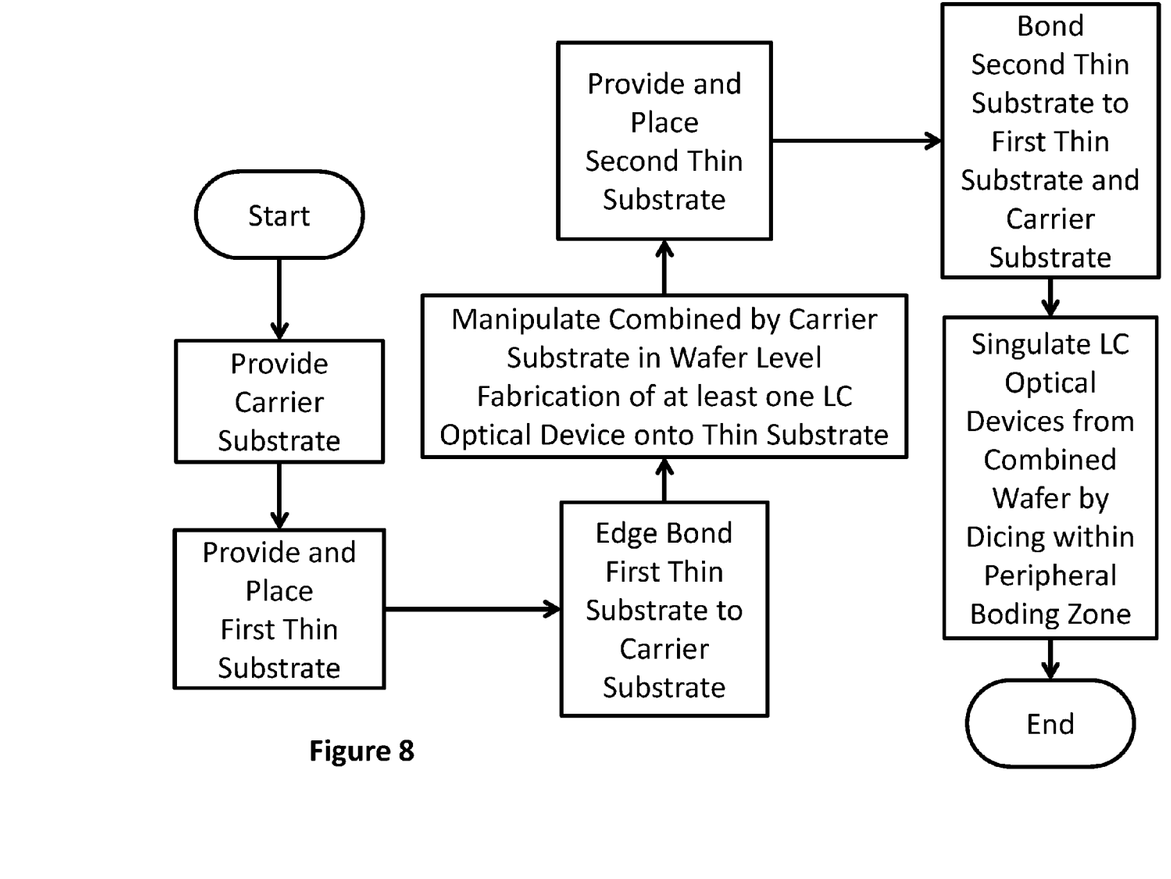
FIG. 8 schematically illustrates alternative process steps in manufacturing a liquid crystal optical device.

In general, the bottom carrier substrate 108 is removed after the wafer level fabrication of the at least one liquid crystal optical device 102. The bottom carrier substrate 108 can be removed prior to dicing or after dicing. When dicing is employed in the removal of the carrier substrate 108, the combined substrate is diced inside the peripheral adhesive bands along dicing lines 110 illustrated in dashed lines. General process steps in such manufacturing are illustrated in FIG. 8. The panel or wafer 112 of manufactured liquid crystal optical devices has sufficient thickness for self support after removal of the carrier substrate 108.

For example, the liquid crystal optical devices 102 include electrically variable (tunable) liquid crystal lenses or liquid crystal beam steering devices. Unlike liquid crystal display panels, tunable liquid crystal lenses and beam steering devices employ a much larger gap between the (thin) substrates 106 sandwiching the liquid crystal layer therebetween, namely about 30 to 100 microns. Very small imperfections in the thin substrates 106, in the order of a few microns, will not affect the quality of the liquid crystal cells of such devices 102, whereas for display panels, such imperfections will cause visible defects which cannot be tolerated. The invention is not limited to a particular substrate material, for example plastic or glass substrates can be employed.

Figure 3A:
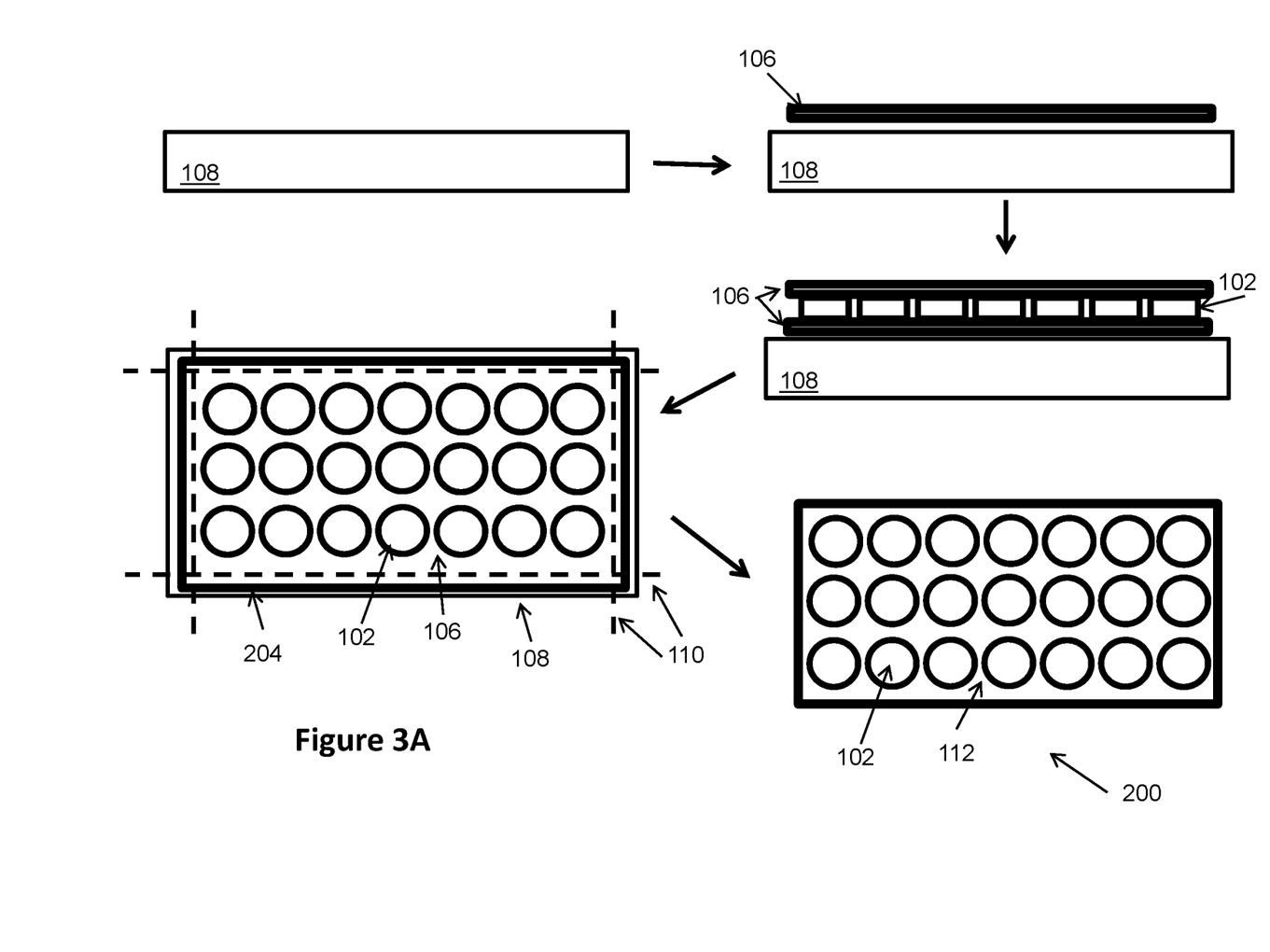
FIG. 3A illustrates a sequence of manufacturing steps employing a peripheral glass-to-glass bonding for securing a thin substrate to a carrier substrate, the use of the combined substrates for wafer level fabrication of at least one liquid crystal optical device, and illustrates final removal of the carrier substrate, in accordance with another embodiment of the proposed solution.

FIG. 3A illustrates a sequence of wafer level fabrication steps 200 similar to fabrication steps 100 illustrated in FIG. 2. In accordance with another embodiment of the proposed solution glass-to-glass sealing is employed for securing a thin glass substrate 106 to a carrier glass substrate 108 along the edges 204 of the thin glass substrates. The combined substrate is manipulated by the carrier glass substrate 108 during wafer level fabrication. Final removal of the carrier glass substrate 108 can include dicing along dicing lines 110 inside the edge seals 204 of the combined substrate.

Figure 3B:
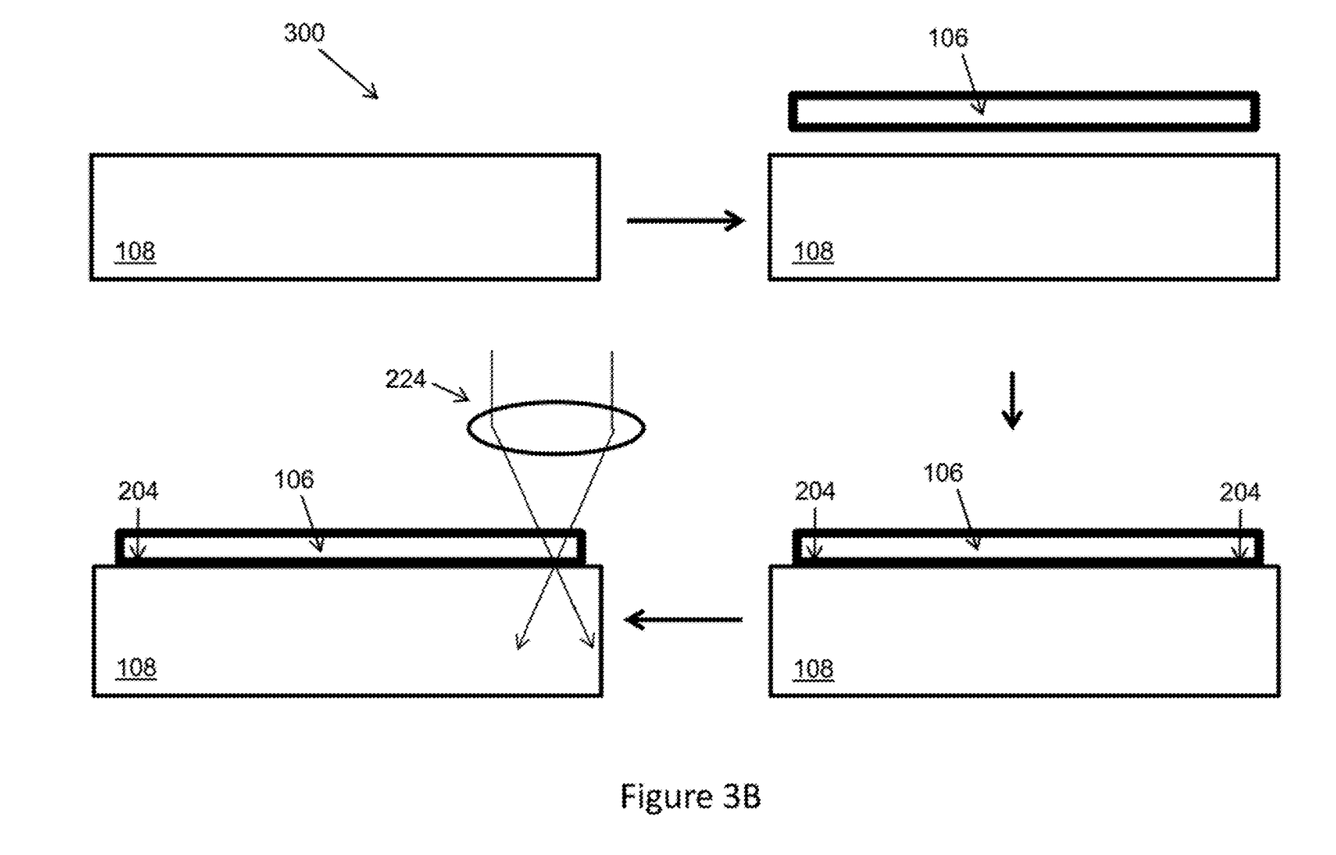
FIG. 3B illustrates a sequence of manufacturing steps employing laser welding along a peripheral band for securing a thin glass substrate to a carrier glass substrate in accordance with an implementation of the proposed solution.

In accordance with one implementation of the proposed solution, FIG. 3B illustrates a sequence of wafer level fabrication steps 300 employing laser welding along a peripheral band 204 for securing the thin glass substrate 106 to the carrier glass substrate 108. The thin glass substrate 106 and carrier glass substrate 108 are first cleaned (not shown) in accordance with glass manufacturer recommended cleaning processes, and then brought into close contact using pressure, vacuum, surface functionalization, etc. The laser 224 is focused on the boundary between the substrates 106/108 to create a peripheral edge bond 204. The combined substrate is manipulated during wafer level device fabrication by the carrier glass 108. Final removal of the carrier substrate 108 includes dicing inside the peripheral edge bonding 204.

Figure 4:
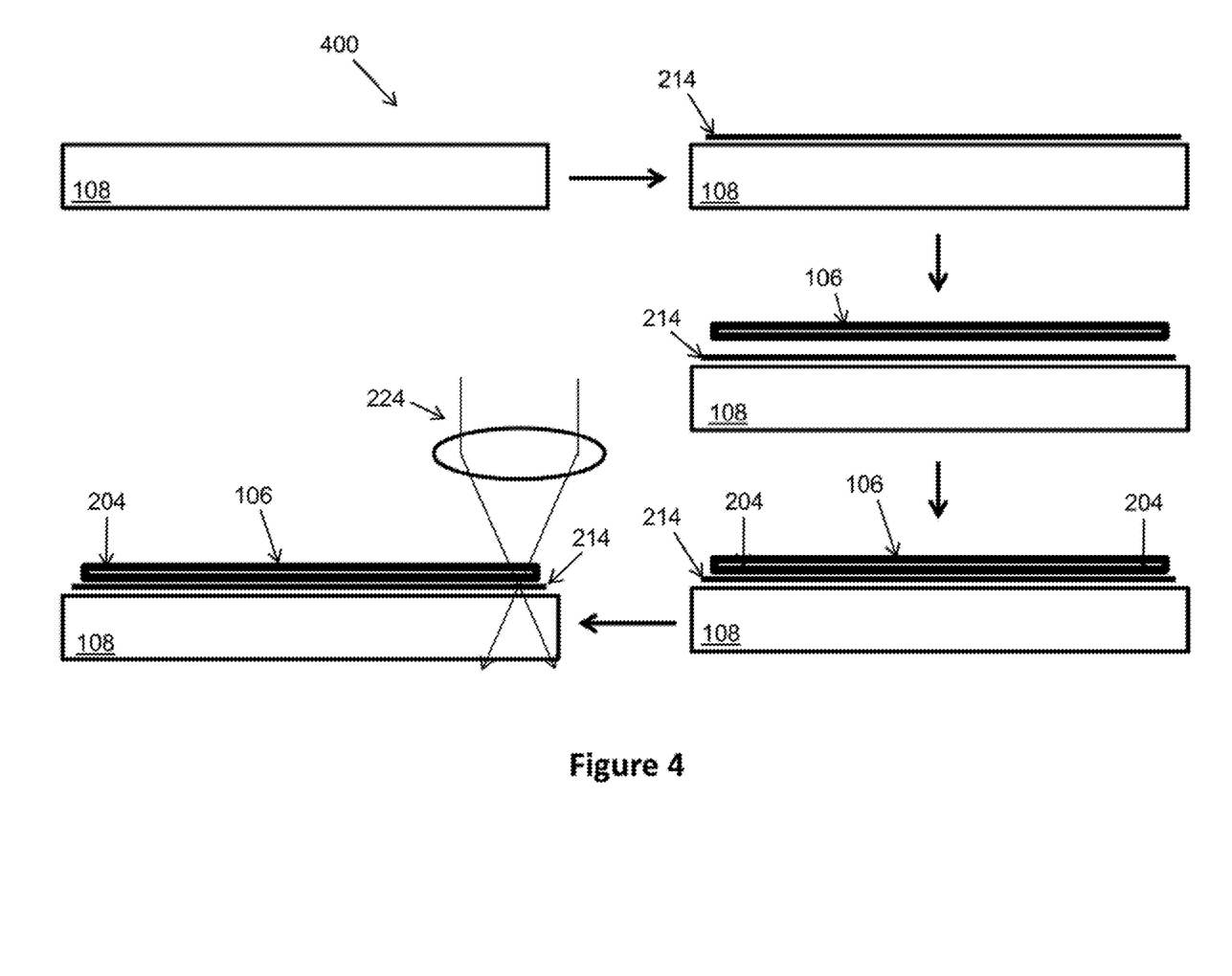
FIG. 4 illustrates a sequence of manufacturing steps employing depositing a metal layer covering peripheral seal areas, and employing a laser, an acoustic or other energy source to cause the metal deposition layer to bond a thin substrate to the carrier substrate in accordance with another embodiment of the proposed solution.

FIG. 4 illustrates a sequence of manufacturing steps 400 employing a deposited metal band layer 214 covering peripheral seal areas 204, and employing a laser, a acoustic heating or other energy source 224 to cause the metal deposition layer 214 to bond the thin substrate 106 to the carrier substrate 108 along the peripheral edge of the thin substrate 106. In some implementations, metal (metal alloy or other composite) band deposition can be provided on the carrier substrate 108 by employing a shadow mask. Non limiting examples of suitable sealing coating materials (214) can include: Chromium, Kovar (Iron-Nickel-Cobalt alloy), etc. Chromium may react with glass improving the bond strength. Kovar has a low thermal expansion similar to glass. Kovar can bond to glass via an intermediate oxide layer of nickel oxide and cobalt oxide. The presence of cobalt makes the oxide layer easier to melt and dissolve in the molten glass.

In other implementations peripheral areas of both thin 106 and carrier 108 substrates to be sealed can be coated with a thin metal band 214 providing additional simplifications in the sealing process.

The laser 224 is focused on metal layer 214 between the substrates 106/108 to create the peripheral edge bond 204. Other types of sealing methods (e.g., acoustic heating, etc.) can be used to heat-transform the peripheral band 214 between the two substrates 106/108 and seal them together.

The combined substrate is manipulated during wafer level device fabrication by the carrier glass 108. Final removal of the carrier substrate 108 includes dicing inside the peripheral edge bonding 204.

Figure 5:
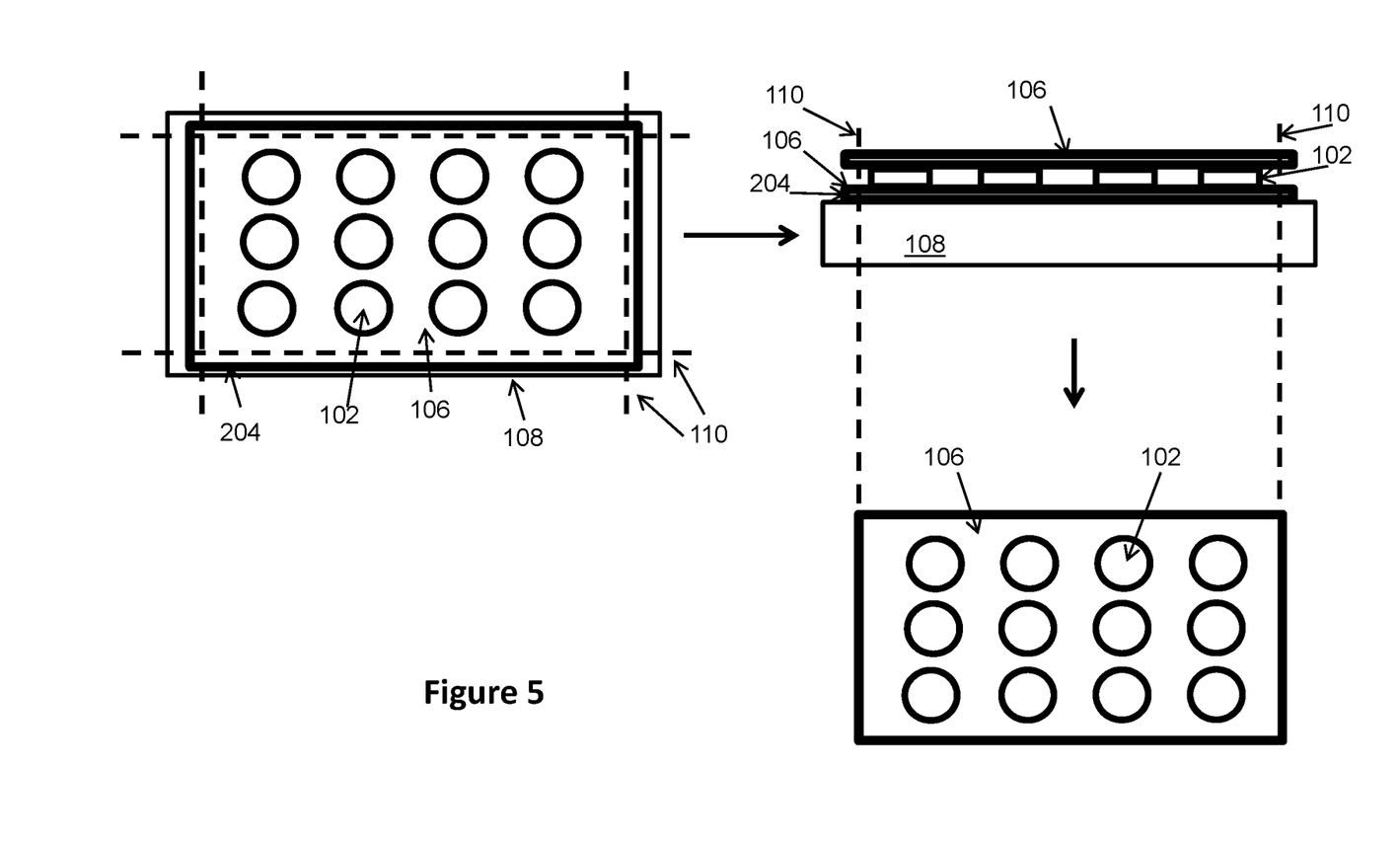
FIG. 5 schematically illustrates manufacturing of liquid crystal optical devices on a panel or wafer having a thin substrate bonded to a carrier substrate and subsequent singulation of the liquid crystal optical devices in accordance with the proposed solution.

FIG. 5 schematically illustrates liquid crystal optical devices 102 manufactured on a panel or wafer having a thin substrate 106 bonded 204 to a carrier substrate 108. The combined substrate is manipulated during wafer level device fabrication by the carrier glass 108 for performing steps (not shown), such as, but not limited to: applying coatings, screen printing, depositions, drop filling, etc., preferably inside the dicing lines 110.

The panel or wafer can be rectangular or circular, or any other desired shape. For example, for manufacturing tunable liquid crystal lens devices the number of liquid crystal optical devices 102 on a wafer or panel is typically at least in the several hundreds if not in the thousands. Such parallel wafer level fabrication can greatly reduce the per-unit cost of such liquid crystal optical devices. A typical tunable liquid crystal lens device has an aperture of about 3 to 4 mm, and a device size of about 5 to 8 mm square.

Figure 6:
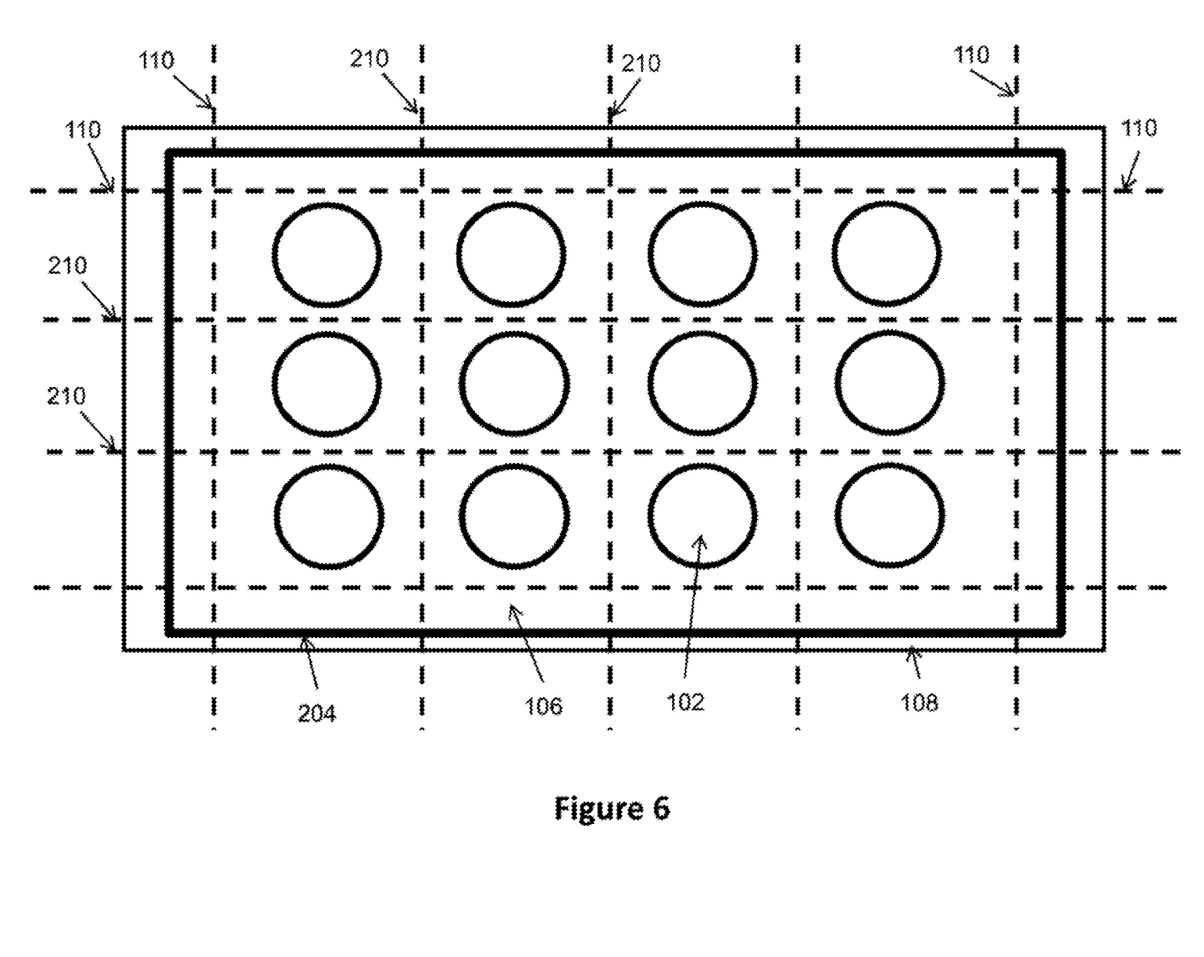
FIG. 6 schematically illustrates employing additional seal points or lines added to a combined panel or wafer, which seal points or lines can be removed during dicing or singulation so as to remove the carrier substrate from the singulated devices, in accordance with the proposed solution, FIG. 7 schematically illustrates process steps in manufacturing liquid crystal optical devices.
Figure 9:
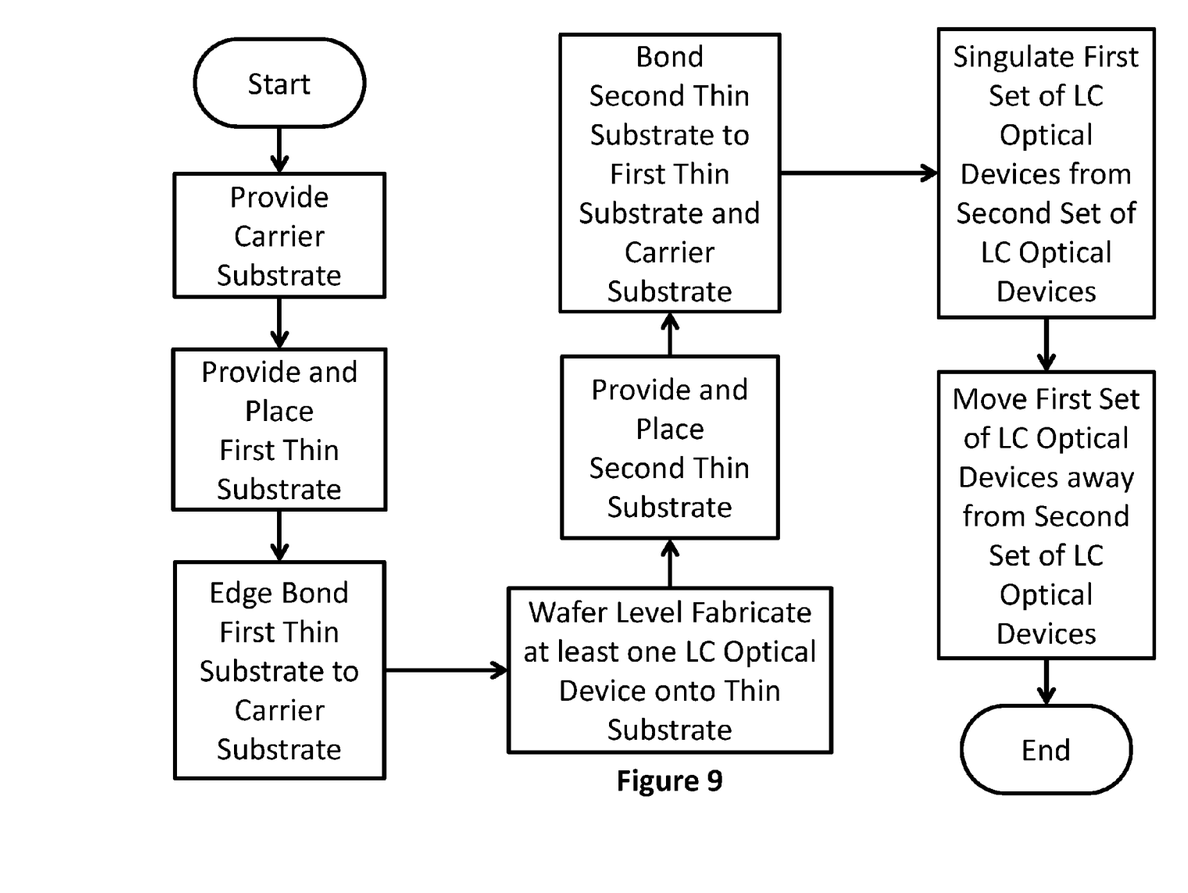
FIG. 9 schematically illustrates other process steps in manufacturing a liquid crystal optical device.

In accordance with another embodiment of the proposed solution, FIG. 6 illustrates additional seal points or seal lines being added to the panel or wafer when wafer-level fabricating multiple devices 102 which must be separated after the manufacturing process. By appropriate positioning thereof, for example along the dashed lines 210 the seal points or lines can be removed during dicing (general process steps are illustrated in FIG. 9) or singulation in removing the carrier substrate 108 from the singulated devices (102).

For certainty, there are no transparency requirements for the peripheral sealing bands 204, providing for a large variety of materials to be employed. Moreover, non-transparent materials can be used to also create reference points (prudential) for further manufacturing process.

While the invention has been shown and described with referenced to preferred embodiments thereof, it will be recognized by those skilled in the art that various changes in form and detail may be made therein without departing from the spirit and scope of the invention as defined by the appended claims.

I claim:

1. A method of manufacturing a liquid crystal optical device, such as a lens, comprising:
    edge bonding a thin substrate onto a carrier substrate wherein the thin substrate is not bonded to the carrier substrate in a central portion;
    using the carrier substrate to manipulate the combined thin substrate and carrier substrate while preparing the thin substrate to contain an array of liquid crystal optical devices in the central portion, the liquid crystal optical devices including cell walls for connecting between substrates;
    providing a second substrate and bonding the second substrate to the combined thin substrate and carrier substrate to form the array of liquid crystal optical devices including the cell walls for each liquid crystal optical device; and
    singulating the liquid crystal optical devices, wherein the cell walls support and interconnect the thin substrate to the second substrate.

2. A method of manufacturing a liquid crystal optical device such as a lens, a beam steering device or an optical image stabilization device, the method comprising:
    edge bonding a first thin substrate onto a carrier substrate to obtain a combined substrate;
    manipulating the combined substrate by the carrier substrate for wafer level fabricating at least one liquid crystal optical device on the central portion of the first thin substrate;
    providing a second thin substrate and bonding the second thin substrate to the combined substrate to form the at least one liquid crystal optical device, each liquid crystal optical device including the liquid crystal cell walls, wherein the cell walls support and interconnect the thin first substrate to the second thin substrate; and
    singulating the at least one liquid crystal optical device by dicing the combined substrate within the peripheral bonding zone.

3. A method as claimed in claim 2, wherein the first thin substrate is not bonded to the carrier substrate in the central portion thereof.

4. A method as claimed in claim 2, wherein a plurality of liquid crystal optical devices are wafer level fabricated on the first thin substrate, the method further comprising bonding one of a seal point and a seal line in the central portion of the first thin substrate, wherein singulating the plurality of liquid crystal optical devices further includes dicing the combined substrate along said one of the seal point and seal line for removal thereof.

5. A method as claimed in claim 2, wherein providing each thin substrate and the carrier substrate includes providing substrates of substantially similar material composition for providing similar thermal expansion coefficients.

6. A method as claimed in claim 2, wherein the edge bonding comprises applying thin adhesive bands between the carrier substrate and the first thin substrate along peripheral edges of the first thin substrate.

7. A method as claimed in claim 6, wherein applying the thin adhesive bands comprises applying temperature resistant adhesive bands resistant at temperatures at which polyimide alignment layers can be baked.

8. A method as claimed in claim 2, wherein edge bonding comprises substrate-to-substrate sealing for bonding the first thin substrate to the carrier substrate along peripheral edges of the first thin substrate, wherein substrate-to-substrate sealing includes employing one of laser, acoustic or other energy source.

9. A method as claimed in claim 8, wherein substrate-to-substrate sealing includes focusing a laser on a boundary between the first thin substrate and the carrier substrate, wherein laser bonding provides quasi hermicity.

10. A method as claimed in claim 8, wherein each substrate comprises a glass substrate, wherein prior to laser sealing the method further comprises applying one of a metal band and a composite material band on at least one of the first thin substrate and carrier substrate along the peripheral edges of the first thin substrate.

11. A method as claimed in claim 10, wherein applying the metal band includes depositing the metal band, wherein the metal band comprises one of Chromium, Cobalt and Kovar (Iron-Nickel-Cobalt alloy).

12. A method as claimed in claim 11, wherein depositing the metal band includes providing a shadow mask and depositing metal material through the shadow mask.

13. A method as claimed in claim 10, wherein applying the metal band includes coating the metal band, wherein the metal band comprises one of Chromium, Cobalt and Kovar (Iron-Nickel-Cobalt alloy).

14. A method as claimed in claim 2, wherein wafer level fabricating the liquid crystal optical device comprises a combination of applying coatings, screen printing, depositing materials, drop filing and curing.

15. A method of manufacturing a plurality of liquid crystal optical devices comprising:
    edge bonding a first thin substrate onto a carrier substrate to obtain a combined substrate while leaving a central portion of the first thin film substrate unbonded to the carrier substrate;
    wafer level fabricating a plurality of liquid crystal optical devices including liquid crystal cell walls on the central portion of the first thin substrate while the first thin substrate is edge bonded to the carrier substrate;
    bonding a second thin substrate to the combined substrate such that the cell walls support and interconnect the first thin substrate to the second thin substrate,
    singulating a first set of the plurality of liquid crystal devices from a second set of the plurality of liquid crystal devices; and
    moving the first set of the plurality of liquid crystal devices away from the second set of the plurality of liquid crystal devices.

* * * * *